Patented Feb. 14, 1933

1,897,427

UNITED STATES PATENT OFFICE

RUDOLF M. HEIDENREICH, OF LEVERKUSEN-ON-THE-RHINE, GERMANY, ASSIGNOR TO GENERAL ANILINE WORKS, INC., OF NEW YORK, N. Y., A CORPORATION OF DELAWARE

VAT DYESTUFFS OF THE ANTHANTHRONE SERIES AND PROCESS OF PREPARING THE SAME

No Drawing. Application filed March 8, 1929, Serial No. 345,603, and in Germany March 10, 1928.

The present invention relates to vat dyestuffs of the anthanthrone series and to the process of preparing the same, more particularly it relates to compounds of the probable general formula:

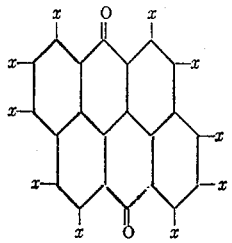

wherein at least one $x$ stands for a cyan group and the other $x$'s stand for hydrogen or monovalent substituents, such as the hydroxy-, alkoxy-, nitro- methyl- and amino-groups.

My new compounds are obtainable by diazotizing an amino-anthanthrone compound in the usual manner with sulfuric acid and sodium nitrite, and boiling the diazo-compound with cuprous cyanide until the evolution of nitrogen has finished, according to Sandmeyer. Otherwise my new compounds are obtainable by heating a halogen-anthanthrone with cuprous cyanide in a high-boiling solvent such as quinoline or benzyl-cyanide, at temperatures of about 180° C. to about 250° C. for several hours. As the new compounds are generally insoluble or scarcely soluble in organic solvents, they separate during the reaction and when the precipitate does not increase, the reaction can be interrupted. The dyestuffs are filtered and are obtained in the form of orange to bluish-black crystals. They are generally insoluble or scarcely soluble in high boiling organic solvents, such as nitrobenzene, quinoline and naphthalene, soluble in concentrated sulfuric acid with various colorations and generally yield violet vats, from which cotton is dyed orange to grey shades of excellent fastness to chlorine and bucking.

The invention is illustrated by the following example, without being limited thereto:

*Example.*—18,6 parts by weight of 2.7-dibromoanthanthrone are boiled in 140 parts by volume of benzyl-cyanide with 8 parts by weight of cuprous cyanide. The dibromo-anthanthrone begins to dissolve, and from the dark solution separate microscopic reddish-brown needles which are assumed to have the following formula:

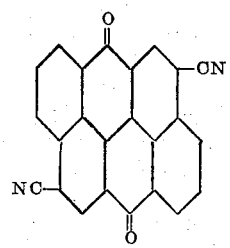

The formation of the new dyestuff is finished after about 1½ to 2 hours. The cold reaction mixture is sucked off, the dyestuff is washed with benzyl-cyanide, then with alcohol, and if desired, it may be recrystallized from a large quantity of naphthalene or quinoline. It is soluble in cold concentrated sulfuric acid with a dull yellowish-green coloration and yields a violet vat from which cotton is dyed reddish-orange shades, fast to chlorine and bucking.

Similar dyestuffs are obtained, if there is used as starting material another bromo-anthanthrone, for example, mono-, tri- and tetra-bromoanthanthrone and derivatives or substitution products thereof. If a halogen-aminoanthanthrone is diazotized in the usual manner and boiled with cuprous cyanide according to Sandmeyer a halogen-cyan-an-thanthrone is obtained.

My new products are further valuable intermediate products in the manufacture of dyestuffs.

I claim:
1. As new products vat dyestuffs of the anthanthrone series of the probable general formula:

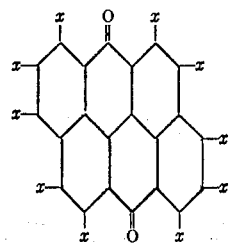

wherein at least one $x$ stands for a cyan group and the other $x$'s stand for hydrogen or monovalent substituents, being orange to bluish-black crystals, difficultly soluble in high-boiling organic solvents, soluble in concentrated sulfuric acid with various colorations, yielding generally violet vats, from which cotton is dyed orange to grey shades of excellent fastness to chlorine and bucking.

2. As a new product the dyestuff of the probable formula:

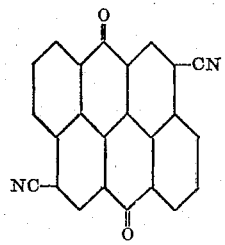

being reddish-brown needles, difficultly soluble in high-boiling solvents, soluble in cold concentrated sulfuric acid with dull yellowish-green coloration, and yielding a violet vat, from which cotton is dyed reddish-orange shades of excellent fastness to chlorine and bucking.

3. The process which comprises heating a halogen-anthanthrone compound with cuprous cyanide in high-boiling organic solvent for several hours at temperatures of about 180° C. to about 250° C.

4. The process which comprises boiling 2.7-dibromoanthanthrone with cuprous cyanide in benzylcyanide for about 1½ to 2 hours.

In testimony whereof I have hereunto set my hand.

RUDOLF M. HEIDENREICH. [L. S.]